(12) United States Patent
Coenen et al.

(10) Patent No.: US 10,300,636 B2
(45) Date of Patent: May 28, 2019

(54) METHOD AND DEVICE FOR PRODUCING AN OPTICAL COUPLING ELEMENT MADE OF ELASTOMER

(71) Applicant: PMA/TOOLS AG, Willich (DE)

(72) Inventors: Dominik Coenen, Viersen (DE); Detlef Westerburg, Nettetal (DE)

(73) Assignee: PMA/TOOL AG, Willich (DE)

( * ) Notice: Subject to any disclaimer, the term of this patent is extended or adjusted under 35 U.S.C. 154(b) by 32 days.

(21) Appl. No.: 15/542,078

(22) PCT Filed: Apr. 18, 2016

(86) PCT No.: PCT/EP2016/058481
§ 371 (c)(1),
(2) Date: Jul. 7, 2017

(87) PCT Pub. No.: WO2016/169870
PCT Pub. Date: Oct. 27, 2016

(65) Prior Publication Data
US 2018/0001518 A1   Jan. 4, 2018

(30) Foreign Application Priority Data

Apr. 22, 2015  (EP) .................................... 15164586

(51) Int. Cl.
| | | |
|---|---|---|
| *B29C 39/00* | (2006.01) | |
| *B29C 69/00* | (2006.01) | |
| *B26F 1/38* | (2006.01) | |
| *B29C 33/40* | (2006.01) | |
| *B29C 39/26* | (2006.01) | |
| *B26F 3/00* | (2006.01) | |

(Continued)

(52) U.S. Cl.
CPC .......... *B29C 39/006* (2013.01); *B26F 1/3846* (2013.01); *B26F 3/004* (2013.01); *B26F 3/16* (2013.01); *B29C 33/40* (2013.01); *B29C 39/26* (2013.01); *B29C 69/005* (2013.01); *B29C 2791/009* (2013.01); *B29C 2793/0009* (2013.01); *B29C 2793/0054* (2013.01); *B29K 2021/00* (2013.01)

(58) Field of Classification Search
CPC .................................................. B29C 39/006
See application file for complete search history.

(56) References Cited

U.S. PATENT DOCUMENTS

| | | | |
|---|---|---|---|
| 2,200,730 A | 5/1940 | Molleson, et al. | |
| 5,702,556 A | 12/1997 | Okuma et al. | |

(Continued)

FOREIGN PATENT DOCUMENTS

| | | |
|---|---|---|
| DE | 4405285 A1 | 8/1994 |
| DE | 102006039065 A1 | 3/2007 |

(Continued)

*Primary Examiner* — Jacob T Minskey
(74) *Attorney, Agent, or Firm* — Leydig, Voit & Mayer, Ltd.

(57) ABSTRACT

A method for producing an optical coupling element made of elastomer includes filling a free-flowing elastomer formulation or its constituents into a mold so as to produce a flat sheet whose thickness is adapted to a thickness of the optical coupling element that is to be produced. The elastomer formulation or its constituents is cured to form an inherently stable elastomer. Individual optical coupling elements are cut out of the flat sheet.

8 Claims, 3 Drawing Sheets

(51) Int. Cl.
*B26F 3/16* (2006.01)
*B29K 21/00* (2006.01)

(56) References Cited

U.S. PATENT DOCUMENTS

| | | |
|---|---|---|
| 2004/0168559 A1 | 9/2004 | Ide et al. |
| 2009/0234449 A1* | 9/2009 | De Juan, Jr. .......... A61F 2/1635 623/6.22 |
| 2009/0266396 A1 | 10/2009 | Niira et al. |
| 2010/0079881 A1* | 4/2010 | Lynam .................... B60R 1/082 359/864 |

FOREIGN PATENT DOCUMENTS

| | | |
|---|---|---|
| DE | 102008026997 A1 | 12/2009 |
| DE | 102013012849 A1 | 2/2015 |
| EP | 1413490 A2 | 4/2004 |
| EP | 2130727 A2 | 12/2009 |
| EP | 2181023 B1 | 6/2013 |
| JP | 04216911 A | 8/1992 |

* cited by examiner

US 10,300,636 B2

METHOD AND DEVICE FOR PRODUCING AN OPTICAL COUPLING ELEMENT MADE OF ELASTOMER

CROSS-REFERENCE TO PRIOR APPLICATIONS

This application is a U.S. National Stage Application under 35 U.S.C. § 371 of International Application No. PCT/EP2016/058481 filed on Apr. 18, 2016, and claims benefit to European Patent Application No. EP 15164586.8 filed on Apr. 22, 2015. The International Application was published in German on Oct. 27, 2016 as WO 2016/169870 A2 under PCT Article 21(2).

FIELD

The invention relates to a method and to a device for the production of an optical coupling element made of elastomer.

Optical coupling elements of the above-mentioned type are employed to optically couple an optical sensor located in the interior of a vehicle to the window pane of the vehicle. In order to ensure the reliable functioning of the sensor, it is desirable for the refractive index of the material used for the coupling element to be the same as the refractive index of the vehicle window pane. Furthermore, it is preferred for the material used for the coupling element to have the highest possible transmittance or permeability to light of the relevant wavelength. In this context, this can be light in the visible or invisible spectral range, depending on the application case.

BACKGROUND

In view of the above-mentioned requirements, the state of the art makes use of silicone materials as the materials for the coupling element. Examples of such silicone materials are disclosed in European patent specification EP 2 181 023 B1 and German patent application DE 10 2008 026 997 A1, and are also known under the trade names "Silgel 612" and "Semicosil 912". Such materials are commercially available, for instance, from the BAYER company or from the WACKER company.

The above-mentioned materials are used for the "in situ" production of coupling elements, whereby initially free-flowing and then curing material is placed into a space in the housing of the optical sensor. The sensor housing is subsequently attached to the window pane, so that the cured silicone material then comes to rest against the window pane. Such a production technique is demanding, both at the time of the initial installation and when a vehicle window pane has to be repaired. When a vehicle window pane or a sensor is repaired, it also has the drawback that the coupling element, which is not inherently stable, is destroyed and therefore cannot be re-used.

SUMMARY

In an embodiment, the present invention provides a method for producing an optical coupling element made of elastomer. A free-flowing elastomer formulation or its constituents are filled into a mold so as to produce a flat sheet whose thickness is adapted to a thickness of the optical coupling element that is to be produced. The elastomer formulation or its constituents is cured to form an inherently stable elastomer. Individual optical coupling elements are cut out of the flat sheet.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
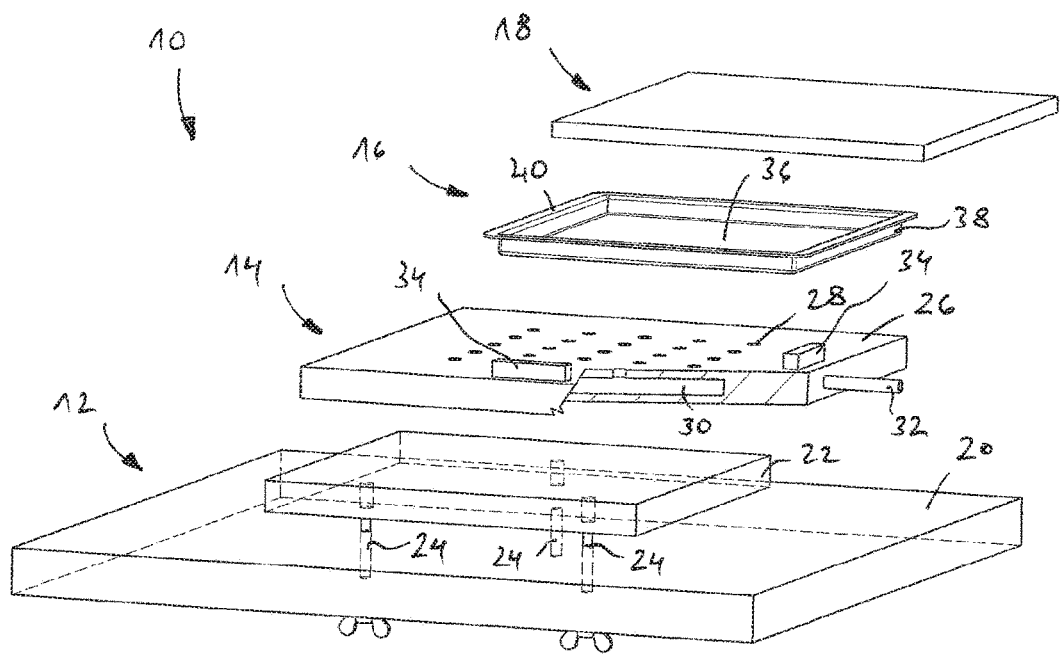
FIG. 1 is a perspective exploded view of an embodiment of a device for the production of an optical coupling element made of elastomer.

In an embodiment, the present invention provides a method and a device that permit a simple, inexpensive and flexible production of an optical coupling element.

According to an embodiment, the method comprises:
filling a free-flowing elastomer formulation or its constituents into a mold in order to produce a flat sheet whose thickness is adapted to the thickness of the coupling element that is to be produced,
curing to form an inherently stable elastomer,
cutting individual coupling elements out of the flat sheet.

According to an embodiment, the device comprises: a mold to be filled with a free-flowing elastomer formulation or with its constituents in order to produce a flat sheet whose thickness is adapted to the thickness of the coupling element that is to be produced, and a cutting tool to cut individual coupling elements out of the flat sheet.

According to an embodiment of the invention, first of all, a flat sheet is produced whose thickness can easily be influenced in that a larger or smaller quantity of free-flowing elastomer formulation or of its constituents is filled into the mold. Therefore, a mold that is open on one side in the thickness direction of a coupling element is used such as, for instance, a tub.

The flat sheet extends over a larger surface area than the one required for the production of a single coupling element, preferably for the production of several coupling elements. Since the individual coupling elements are cut out of the flat sheet after the elastomer has already cured and is inherently stable, a coupling element that has been cut out of the flat sheet no longer undergoes shrinkage. Thus, regardless of the formulation used for the coupling element, it is ensured that the cutting contour used for cutting out the coupling element exactly matches the contour of the finished coupling element.

When the term "inherently stable" is used within the scope of the present invention, it means that a coupling element can be handled individually so that the coupling element can be stored and kept in stock for installation on an optical sensor and/or on a vehicle window pane. Consequently, the inherently stable coupling element is not produced "in situ" in or on the sensor housing.

When a switch is made to a different elastomer formulation, the associated change in the shrinkage during the curing process can be easily compensated for by adapting the amount filled into the mold.

The method according to an embodiment of the invention makes it possible to avoid drawbacks that are associated with the production of an optical coupling element by means of an injection molding method (or reaction injection molding method), which would likewise be conceivable in principle and which would make use of a closed injection mold. For example, there is no need to provide specific and expensive injection molds for different coupling elements with different dimensions. Furthermore, it is not necessary to provide injection molds that each have an oversize that is adapted precisely to the shrinkage that is associated with a specific curing process. Since the extent of shrinkage also depends on the constituents used for the elastomer formulation, a change in the constituents can also make it necessary to retool an injection mold or to build a new one.

Within the scope of an embodiment of the present invention, an especially simply structured mold can be used that is, for instance, circular or rectangular. This is made possible in that the flat sheet has a larger surface area than at least one coupling element and in that the coupling element is cut out of the flat sheet after the flat sheet has been produced.

Preferably, the coupling element according to an embodiment of the invention is made of a silicone elastomer, whereby a free-flowing silicone formulation or its constituents are filled into the mold in order to produce the flat sheet.

The individual coupling elements can be cut out of the flat sheet once the flat sheet, which consists of the cured inherently stable elastomer, has been removed from the mold. In this manner, the mold can be used once again immediately after the curing process in order to produce another flat sheet.

In a preferred embodiment of the invention, however, it is provided that individual coupling elements are cut out of the flat sheet while the flat sheet is still in the mold after it has cured. This facilitates the handling of the flat sheet while individual coupling elements are being cut out.

Another preferred embodiment provides that a section of the bottom of the mold is cut out, whereby the bottom section forms a protective element that can be detached from the coupling element and that protects the underside of the coupling element. In this context, it is preferable that a bottom section and a coupling element are cut out simultaneously or immediately one after the other, preferably using only one stamping tool.

Moreover, it is preferred for the mold to be made of a plastic material that can be cut more easily than a metal material that would likewise be conceivable in principle. Preferred plastic materials include polystyrene (PS), acrylonitrile-butadiene-styrene (ABS), polycarbonate (PC), polymethyl methacrylate (PMMA), polyethylene terephthalate (PET), polybutylene terephthalate (PBT), polyethylene (PE), polypropylene (PP), silicone or the like. Moreover, a plastic material entails the advantage of being very inexpensive, whereby the material employed for a single mold is sufficient for several coupling elements, depending on the size of the mold. The offcut material that is inevitably generated can be recycled, especially when thermoplastic materials are used.

The bottom section adheres to the coupling element and can be removed immediately before being mounted on a vehicle window pane. In this manner, at least the underside of the coupling element is protected against dirt and/or mechanical influences. Moreover, the bottom section forms a stable support for the coupling element.

It is possible for the bottom section and the coupling element to have surface areas of identical sizes. This has the advantage that the procedure for cutting a coupling element out of the flat sheet and for cutting a section out of the bottom of the mold is very easy.

A preferred variant of the invention, however, provides that the bottom section extends beyond the coupling element by at least a certain handling section. This has the advantage that the bottom section can be gripped by the handling section and the protective element can be very easily removed from the coupling element, without any contact with the optically active surface of the coupling element occurring.

The techniques that are preferred within the scope of the invention for cutting out the coupling element and/or the bottom section are stamping, water-jet cutting or laser-beam cutting. These methods are suitable in cases when the flat sheet is removed from the mold after curing to form an elastomer as well as in cases when the flat sheet remains in the mold while individual coupling elements are being cut out. If the flat sheet remains in the mold during the cutting procedure, then different dimensions of the bottom section and of the coupling element can be achieved in that the power of the water jet or laser beam is adapted accordingly. Lower power levels are sufficient in order to create exclusively a cutting contour of the coupling element, whereas the power can be increased in order to create a cutting line that also cuts through the bottom of the mold.

An especially simple technique for cutting out a coupling element and/or a bottom section, however, is stamping. Accordingly, a preferred cutting tool is a stamping tool.

It is especially preferred if the stamping tool has two stamping elements that are arranged offset relative to each other as seen in the stamping direction, whereby a first stamping element serves to at least partially cut a coupling element out of the flat sheet, while a second stamping element serves to cut through the flat sheet and to cut out a bottom section of the bottom of the mold.

In particular, a first stamping element serves to cut a first section of a coupling element out of the flat sheet, whereas a second stamping element serves to first cut out a second section of the coupling element that adjoins the first coupling element section, and subsequently to cut out a bottom section of the bottom of the mold. As seen in the stamping direction, the first stamping element is recessed vis-á-vis the second stamping element, namely, to an extent that essentially matches the thickness of the bottom of the mold.

In particular, preference is given to two stamping elements that are arranged offset relative to each other when the bottom section is supposed to extend beyond the underside of the coupling element in the area of a handling section.

In another embodiment of the invention, it is provided that a protective film is used as a protective element that can be removed from the coupling element and that protects the top of the coupling element. Such a protective film can be subsequently placed onto an already cut out coupling element; however, it can also be laid onto the flat sheet when it has already cured or when it has not yet cured, so that, by means of a simple cutting procedure, especially by stamping, but also by water-jet cutting or laser-beam cutting, this protective film can be cut at the same time as when the coupling element is being cut out.

Also when it comes to a protective element arranged on the top of the coupling element, it is preferred if a gripping section is provided that facilitates the removal of the protective element from the coupling element. In the case of this gripping section, however, it is preferred if the gripping section is provided separately from a film layer, for example, if it is applied subsequently. In this manner, a protective film section whose surface area is identical to that of the coupling element can be produced while the coupling element is being cut out of the flat sheet, namely, in that the cutting tool cuts the top protective film and the flat sheet in one work step.

With a device according to an embodiment of the invention, it is also preferred if it has an orientation mechanism that serves to orient the mold in a horizontal plane. In this manner, irrespective of the production site, it is ensured that the flat sheet has a constant thickness over its entire surface area.

Furthermore, it is preferred if the device has a suction mechanism that serves to affix the mold on a placement surface so as to prevent accidental movement of the mold, especially during the curing process. It is especially preferred if the suction mechanism is provided in the form of a vacuum table that permits a tool-free fixation of the mold. The vacuum tabletop, in turn, can be oriented by means of the above-mentioned orientation mechanism.

An embodiment of a device for the production of an optical coupling element made of elastomer is referred to in its entirety by the reference numeral 10 in the drawing. The device 10 comprises an orientation mechanism 12 for arranging a suction mechanism 14 which, in turn, serves to affix a mold 16. The device comprises an optional cover plate 18 that serves to cover the mold 16, without coming into contact with the material that is going to be filled into the mold 16.

The orientation mechanism 12 has a baseplate 20 on the bottom and it can be arranged on a table or on the floor of a room. Moreover, the orientation mechanism 12 has an adjustment plate 22 whose angle of inclination relative to the baseplate 20 can be set by means of adjustment elements 24. Preferably, there are three adjustment elements 24 arranged at a distance from each other, which together, encompass an adjustment plane. The adjustment elements 24 make it possible to orient the adjustment plate 22 in a precisely horizontal position.

The adjustment plate 22 serves for the placement of the suction mechanism 14. It is configured in the form of a vacuum or hollow plate 26 and it has air inlet openings 28 that are located on its top and that communicate with a vacuum connection 32 via a hollow space 30.

It is possible, but not absolutely necessary, for positioning elements 34 to be arranged on the top of the plate 26, and these positioning elements 34 are configured as a stop for the mold 16 and/or as a spirit level to check the horizontal orientation.

The mold 16 has a flat bottom 36 whose edge makes a transition to a side wall 38 that surrounds the circumference. Optionally, the upper edge of the side wall 38 can be provided with a collar 40 that extends essentially parallel to the bottom. This stabilizes the mold 16 and allows the placement of an edge surface on the underside of the optional cover plate 18.

Figure 2:
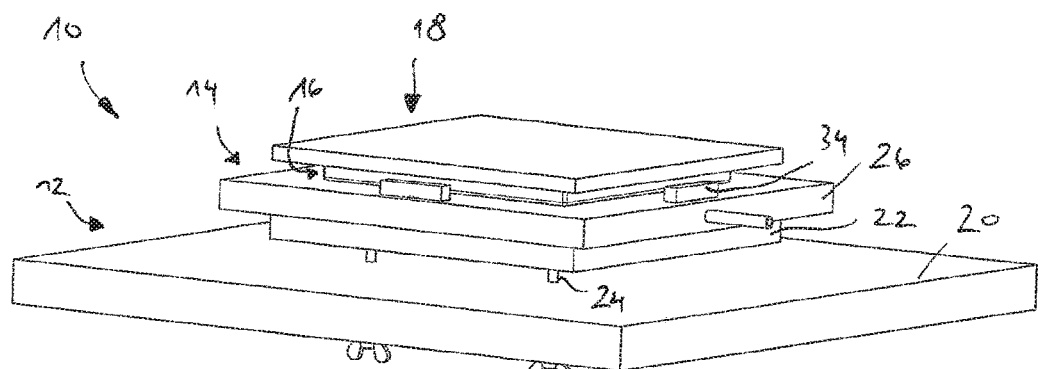
FIG. 2 is a perspective view of the device according to FIG. 1.

When the device is in its assembled state (see FIG. 2), the mold 16 is oriented exactly horizontally by means of the adjustment plate 22. Moreover, the suction mechanism 14 is firmly joined to the adjustment plate 22. The mold 16 is affixed to the suction mechanism 14 in that a vacuum is applied to the vacuum connection 32. The side wall 38 of the mold 16 rests against the positioning elements 34.

Figure 4:
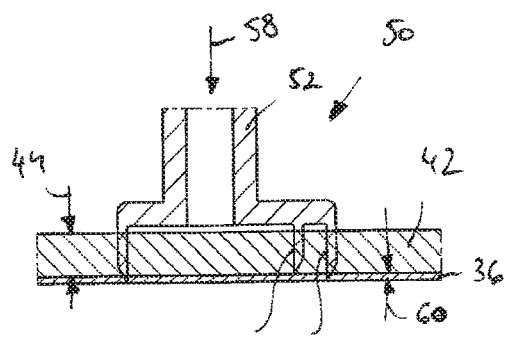
FIG. 4 is a side view along a cutting plane indicated by IV-IV in FIG. 3.
Figure 3:
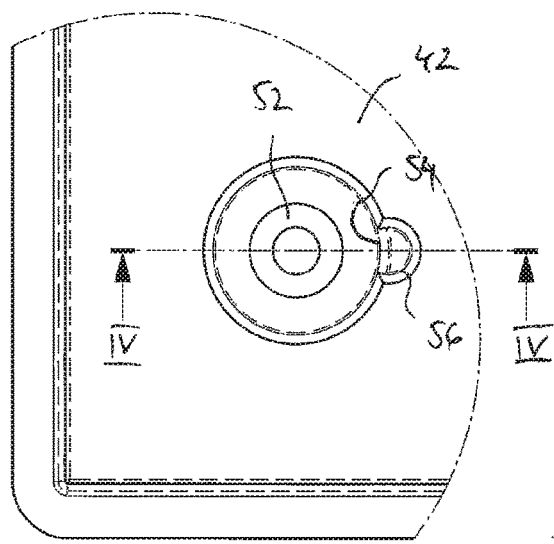
FIG. 3 is a top view of a part of the device as well as of a stamping tool.

In order to produce a coupling element, the mold 16 is filled with a free-flowing, not yet cured silicone formulation or with its constituents. In this context, the filled quantity is dimensioned in such a way that an inherently stable flat sheet 42 that is formed in the mold 16 after having cured has a thickness 44 (see FIG. 4) that matches the thickness 46 of a coupling element 48 (see FIG. 5) that is to be cut out of the flat sheets. If the material used is contraction-free or shrinkage-free, then the filling height of the free-flowing material is identical to the thickness 44 of the flat sheet 42 after its curing to form an inherently stable silicone elastomer. If a contraction or shrinkage occurs during or after the curing, the filling height of free-flowing material is higher than the thickness 44 of the flat sheet 42, by a value that corresponds to the shrinkage.

In order to cut a single coupling element 48 out of the flat sheet 42, preferably a cutting tool 50 in the form of a stamping tool 52 is used. In particular, the flat sheet 42 remains in the mold 16 while the coupling element is being cut out.

The stamping tool 52 has at least one stamping element, preferably two stamping elements 54, 56. A first stamping element 54 is recessed relative to a second stamping element 56 as seen in the stamping direction 58. The size of the recess corresponds to a thickness 60 of the bottom 36 of the mold 16. In this manner, in just one stamping procedure, it is possible to simultaneously cut out a coupling element 48 that has, for instance, a circular extension and to cut out a bottom section 62 that extends with a handling section 64 beyond the coupling element 48 (see FIG. 5). In the area of the handling section 64, the extension of the bottom section 62 differs from the extension of the coupling element 48.

Figure 6:
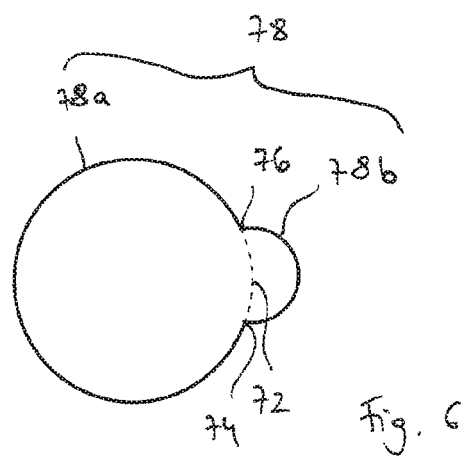
FIG. 6 is a schematic view of the course of the stamping contours of the stamping tool shown in FIGS. 3 and 4.

The first stamping element 54 has a stamping contour 72 that is schematically shown in FIG. 6 by a broken line. The stamping contour 72 extends between an area 74 and an area 76.

The second stamping element 56 has a stamping contour 78 that is shown in FIG. 6 by a solid line and that is made up of a first contour section 78*a* and a second contour section 78*b*. The transitions between the contour sections 78*a* and 78*b* are situated in the areas 74 and 76. The difference between the course of the contour section 78*b* and the course of the stamping contour 72 determines the geometry and size of the handling section 64.

The second stamping element 56 has a stamping contour 78 that itself is closed, whereas the first stamping element 54 has an open stamping contour 72 that itself is not closed.

The first stamping element 54 serves to cut through the flat sheet 42 in the area of a first partial circumference 55 (see FIG. 5) of the coupling element 48. The partial circumference 55 of the coupling element 48 corresponds to the stamping contour 72 of the first stamping element 54 that extends between the areas 74 and 76 (see FIG. 6).

Figure 5:
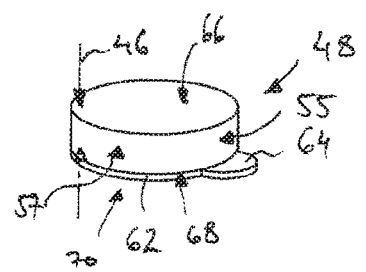
FIG. 5 is a perspective view of an optical coupling element with a protective element arranged on the bottom.

The second stamping element 56 serves to cut through the flat sheet 42 in the area of a second partial circumference 57 that adjoins the first partial circumference 55 of the coupling element 48 (see FIG. 5). The partial circumference 57 of the coupling element 48 corresponds to the contour section 78*a* of the stamping contour 78 of the second stamping element 56 (see FIG. 6).

In the area of the partial circumference 57 of the coupling element 48, the second stamping element 56 not only first stamps through the flat sheet 42, but subsequently also stamps through the bottom 36 of the mold 16.

The second contour section 78*b* of the second stamping element 56 likewise first stamps through the flat sheet 42 and subsequently also through the bottom 36 of the mold 16. The bottom section 62, which has been stamped out by means of the second stamping element 56 with its two contour sections 78*a* and 78*b*, extends beyond the coupling element 48 in the area of the handling section 64.

Figure 7:
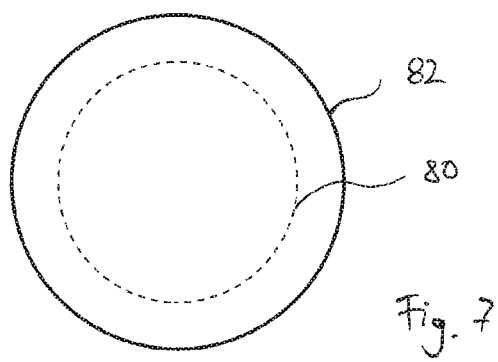
FIG. 7 is a schematic view of an alternative course of the stamping contours of the stamping tool shown in FIGS. 3 and 4.

FIG. 7 shows an alternative course of the stamping contours of the first stamping element 54 and of the second stamping element 56 of the stamping tool 52. As an alternative to a stamping contour 72 according to FIG. 6, the first stamping element 54 has a stamping contour 80 that itself is closed and that is depicted in FIG. 7 by a broken line. As an alternative to a stamping contour 78 according to FIG. 6, the second stamping element 56 has a stamping contour 82 that is depicted in FIG. 6 by a solid line. The stamping contours 80 and/or 82 are, for instance, circular.

Figure 8:
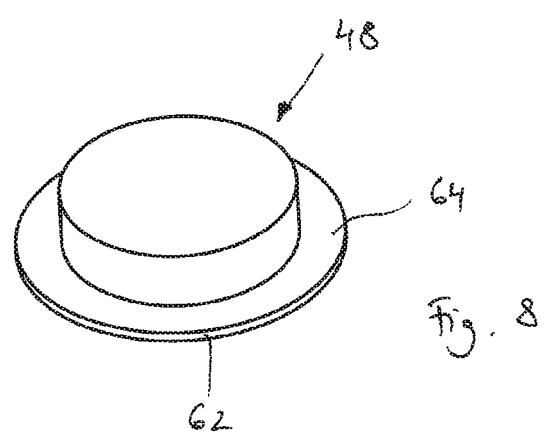
FIG. 8 is a perspective view of an optical coupling element with a protective element arranged on the bottom, produced using a stamping tool with the stamping contours shown in FIG. 7.

Since the stamping contour 82 extends beyond the stamping contour 80 along the entire circumference of the stamping contour 80, a stamping tool 52 with such contours 80, 82 can be used to produce a circumferential, for example, annular, handling section 64 which extends beyond a coupling element 48 in all directions (see FIG. 8). During the production of an arrangement according to FIG. 8, when the coupling element 48 is being stamped out of the molded part 42, an annular material section is additionally created that surrounds the coupling element 48. This material section is formed in an annular interstice between the stamping elements 54 and 56, and it can be lifted off and discarded after the stamping tool 52 has been removed or lifted off the flat sheet 42.

Several stamping tools 52 can advantageously be combined to form a stamping tool arrangement in order to simultaneously cut several coupling elements 48 out of a flat sheet 42.

Optionally, in order to avoid a potential inclusion of dust or other foreign matter during the curing process, the mold 16 can be covered with the cover plate 18 after the mold has been filled with the free-flowing silicone material that is to be cured. Moreover, it is optionally possible, especially before cutting a coupling element 48 out of the flat sheet 42, to lay a protective film onto the flat sheet 42 that has already cured or that still has to be cured.

When a coupling element 48 is being cut out, immediately beforehand, the protective film is cut by means of the stamping tool 52, and the part of the protective film that remains on the coupling element then forms a protective element for the top 66 of the coupling element 48. The underside 68 of the coupling element 48 is protected by the bottom section 62, which forms a protective element 70.

The protective element 70 or the protective elements protect(s) a coupling element 48 immediately after it has been produced until immediately before the coupling element 48 is mounted on the inside of a vehicle window pane, whereby the coupling element 48 is arranged between the inside of a vehicle window pane and the coupling surface of an optical sensor.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for producing an optical coupling element made of elastomer, the method comprising:
   filling a free-flowing elastomer formulation or its constituents into a mold so as to produce a flat sheet whose thickness is adapted to a thickness of the optical coupling element that is to be produced,
   curing the elastomer formulation or its constituents to form an inherently stable elastomer, and
   cutting the optical coupling element out of the flat sheet while the flat sheet is in the mold, wherein a bottom section of a bottom of the mold is cut out, whereby the bottom section forms a protective element that is detachable from the optical coupling element and that serves to protect an underside of the optical coupling element.

2. The method according to claim 1, wherein the bottom section and the optical coupling element have surface areas of identical sizes.

3. The method according to claim 1, wherein the bottom section extends beyond the optical coupling element by at least one handling section.

4. The method according to claim 1, wherein the cutting step is carried out by stamping, water-jet cutting or laser-beam cutting.

5. The method according to claim 1, wherein a removable protective film is used as a protective element that is removable from the optical coupling element and that protects a top of the optical coupling element.

6. The method according to claim 5, wherein the protective element has a gripping section that is used to facilitate removal of the protective element from the optical coupling element.

7. The method according to claim 1, wherein at least one additional optical coupling element is cut out of the flat sheet.

8. A method for producing an optical coupling element made of elastomer, the method comprising:
   filling a free-flowing elastomer formulation or its constituents into a mold so as to produce a flat sheet whose thickness is adapted to a thickness of the optical coupling element that is to be produced, curing the elastomer formulation or its constituents to form an inherently stable elastomer, and cutting the optical coupling element out of the flat sheet together with a protective element that is detachable from the optical coupling element and that serves to protect an underside of the optical coupling element.

\* \* \* \* \*